(12) United States Patent
Cho et al.

(10) Patent No.: US 8,416,168 B2
(45) Date of Patent: Apr. 9, 2013

(54) LIQUID CRYSTAL DISPLAY

(75) Inventors: Dong-Beom Cho, Asan-si (KR);
Dong-Gyun Ra, Asan-si (KR);
Yong-Jun Choi, Asan-si (KR); Woo-Jin Jung, Seoul (KR)

(73) Assignee: Samsung Display Co., Ltd. (KR)

( * ) Notice: Subject to any disclaimer, the term of this patent is extended or adjusted under 35 U.S.C. 154(b) by 688 days.

(21) Appl. No.: 12/630,475

(22) Filed: Dec. 3, 2009

(65) Prior Publication Data

US 2010/0283714 A1 Nov. 11, 2010

(30) Foreign Application Priority Data

May 6, 2009 (KR) .......................... 10-2009-0039316

(51) Int. Cl.
*G09G 3/36* (2006.01)

(52) U.S. Cl.
USPC .................................. 345/90; 345/92; 345/93

(58) Field of Classification Search .................. None
See application file for complete search history.

(56) References Cited

U.S. PATENT DOCUMENTS

| 2004/0046725 | A1* | 3/2004 | Lee | 345/88 |
| 2005/0140906 | A1* | 6/2005 | Baek | 349/144 |
| 2006/0176265 | A1* | 8/2006 | Kim et al. | 345/100 |
| 2007/0262938 | A1* | 11/2007 | Kim | 345/92 |

FOREIGN PATENT DOCUMENTS

| JP | 2006-119539 A | 5/2006 |
| KR | 1020040061810 A | 7/2004 |
| KR | 1020080076317 A | 8/2008 |

* cited by examiner

*Primary Examiner* — Adam R Giesy
(74) *Attorney, Agent, or Firm* — Cantor Colburn LLP

(57) ABSTRACT

A liquid crystal display ("LCD") includes; a gate line, a plurality of pairs of a first data line and a second data line which border a plurality of pixel regions and are disposed respectively on both sides of each pixel region, a plurality of pairs of first and second thin-film transistors ("TFTs") which are connected to the gate line and a pair of the first and second data lines, and a first and second subpixel electrode disposed in each pixel region and connected to the first and second TFTs, respectively, wherein the pixel regions include first through third pixel regions arranged in the first direction, wherein at least one of the first and second TFTs of the second pixel region is disposed on a same side of an adjacent data line as the first and second subpixel electrodes of one of the first and third pixel regions.

19 Claims, 10 Drawing Sheets

LIQUID CRYSTAL DISPLAY

This application claims priority to Korean Patent Application No. 10-2009-0039316, filed on May 6, 2009, and all the benefits accruing therefrom under 35 U.S.C. §119, the content of which in its entirety is herein incorporated by reference.

BACKGROUND OF THE INVENTION

1. Field of the Invention

The present invention relates to a liquid crystal display ("LCD"), and more particularly, to an LCD that can improve display quality by adjusting a light-transmitting area of a specified pixel region.

2. Description of the Related Art

Liquid crystal displays ("LCDs") are one of the most widely used types of flat panel displays ("FPDs"). Generally, a typical LCD includes a pair of substrates, each having electrodes disposed thereon, and a liquid crystal layer interposed between the substrates. In a typical LCD, voltages are applied to electrodes to generate an electric field. The alignment of liquid crystal molecules of the liquid crystal layer is determined according to the electric field applied thereto, and thus the amount of light that passes through the liquid crystal layer is controlled.

One of the two substrates included in an LCD is typically a thin-film transistor ("TFT") substrate, and a plurality of TFTs and a plurality of pixel electrodes are formed on the TFT substrate. To improve the planarization, alignment, and optical characteristics of LCDs, research is being conducted on a color filter on array ("COA") structure in which a color filter is formed on a TFT substrate. In particular, research is being conducted on developing a method of forming a black matrix around each pixel region of a TFT substrate, forming a color filter in each pixel region using an inkjet method, and forming a contact in (or through) the color filter to connect each pixel electrode to a corresponding drain electrode of a TFT.

In this method, however, even when light passes through an equal area of the pixel regions, accurate color capture ("ACC") correction may result in a difference between gamma values of different color filters (e.g., red, green, and blue filters) disposed in the pixel regions. Specifically, after the ACC correction is performed, a gamma value of the blue filter may become different from a gamma value of the red or green filter. In particular, when a screen background image contains clouds, the so-called "color clustering" phenomenon may occur, that is, the clouds may have no gradation, and the screen may appear rough. As a result, display quality may be undermined.

BRIEF SUMMARY OF THE INVENTION

Exemplary embodiments of the present invention provide a liquid crystal display ("LCD") with improved display quality.

However, exemplary embodiments of the present invention are not restricted to the one set forth herein. The above and other exemplary embodiments of the present invention will become more apparent to one of ordinary skill in the art to which the present invention pertains by referencing the detailed description of the present invention given below.

According to an exemplary embodiment of the present invention, an LCD includes; a gate line which is disposed on a first substrate and extends in a first direction, a plurality of pairs of a first data line and a second data line, each pair of a first data line and a second data line being insulated from the gate line, the first data line and the second data line of each pair of a first data line and a second data line extending in a second direction substantially perpendicular to the first direction, the plurality of pairs of a first data line and a second data line bordering a plurality of pixel regions, wherein the first data line and the second data line of each pair of a first data line and a second data line are disposed respectively on both sides of an individual pixel region of the plurality of pixel regions and are separated from each other, a plurality of pairs of a first thin-film transistor and a second thin-film transistor which are connected to the gate line and a pair of a first data line and a second data line of the plurality of pairs of a first data line and a second data line, respectively, and a first subpixel electrode and a second subpixel electrode disposed in each pixel region of the plurality of pixel regions and connected to the first thin-film transistor and the second thin-film transistor, respectively, wherein the plurality of pixel regions comprise first through third pixel regions arranged sequentially in the first direction, wherein at least one of the first thin-film transistor and the second thin-film transistor of the second pixel region is disposed on a same side of an adjacent data line of the pair of a first data line and a second data line as the first subpixel electrode and the second subpixel electrode of one of the first and third pixel regions.

According to another exemplary embodiment of the present invention, an LCD includes; a gate line which is disposed on a substrate and extends in a first direction, a plurality of pairs of a first data line and a second data line which are insulated from the gate line, and which are extend in a second direction to be disposed substantially perpendicular to the gate line, wherein the plurality of pairs of a first data line and a second data line respectively border a plurality of pixel regions, and wherein a first data line and a second data line of a pair of a first data line and a second data line are disposed on opposite sides of an individual pixel region of the plurality of pixel regions and are separated from each other, a plurality of pairs of a first thin-film transistor and a second thin-film transistor which are connected to the gate line and a pair of a first data line and a second data line of the plurality of pairs of a first data line and a second data line, respectively, and a first subpixel electrode and a second subpixel electrode which are disposed in each of the plurality of pixel regions and are connected to a first thin-film transistor and a second thin-film transistor of a pair of the plurality of pairs of a first thin-film transistor and a second thin-film transistor, respectively, wherein the plurality of pixel regions comprise a first pixel region and a second pixel region arranged sequentially in the first direction, wherein the first data line of the second pixel region and the second data line of the first pixel region surround the first thin-film transistor of the second pixel region.

According to another exemplary embodiment of the present invention, an LCD includes; a plurality of gate lines which extends in a first direction, a plurality of data lines which is are insulated from the gate line, crosses overlap at least a portion of the plurality of gate lines, and extends in a second direction that is different from the first direction, and a plurality of pixels, each of which displays an image based on a gate signal and a data signal received respectively from at least one of the plurality of gate lines and the plurality of data lines, wherein the plurality of pixels and which are is divided into a plurality of pixel groups, wherein each pixel group of the plurality of pixel groups comprises a blue pixel, a red pixel, a green pixel, and a white pixel, and wherein the blue pixel, the red pixel, the green pixel, and the white pixel are arranged in a matrix shape, and the blue pixel is larger than the red pixel, the green pixel, and the white pixel.

According to another exemplary embodiment of the present invention, an LCD includes; a gate line which extends in a first direction, a plurality of data lines which are insulated from the gate line, overlap at least a portion of the plurality of gate lines, and extend in a second direction that is different from the first direction and a plurality of pixels, each of which displays an image based on a gate signal and a data signal received respectively from the gate line and the plurality of data lines and wherein the plurality of pixels is divided into a plurality of pixel groups, wherein each pixel group comprises first through third pixels arranged sequentially in the first direction and a plurality of white pixels, and each of the first through third pixels comprises a first subpixel and a second subpixel, wherein a voltage level of a first data signal transmitted to the first subpixel is lower than a voltage level of a second data signal transmitted to the second subpixel, and the white pixels are alternately interposed between the respective second subpixels of the first through third pixels.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
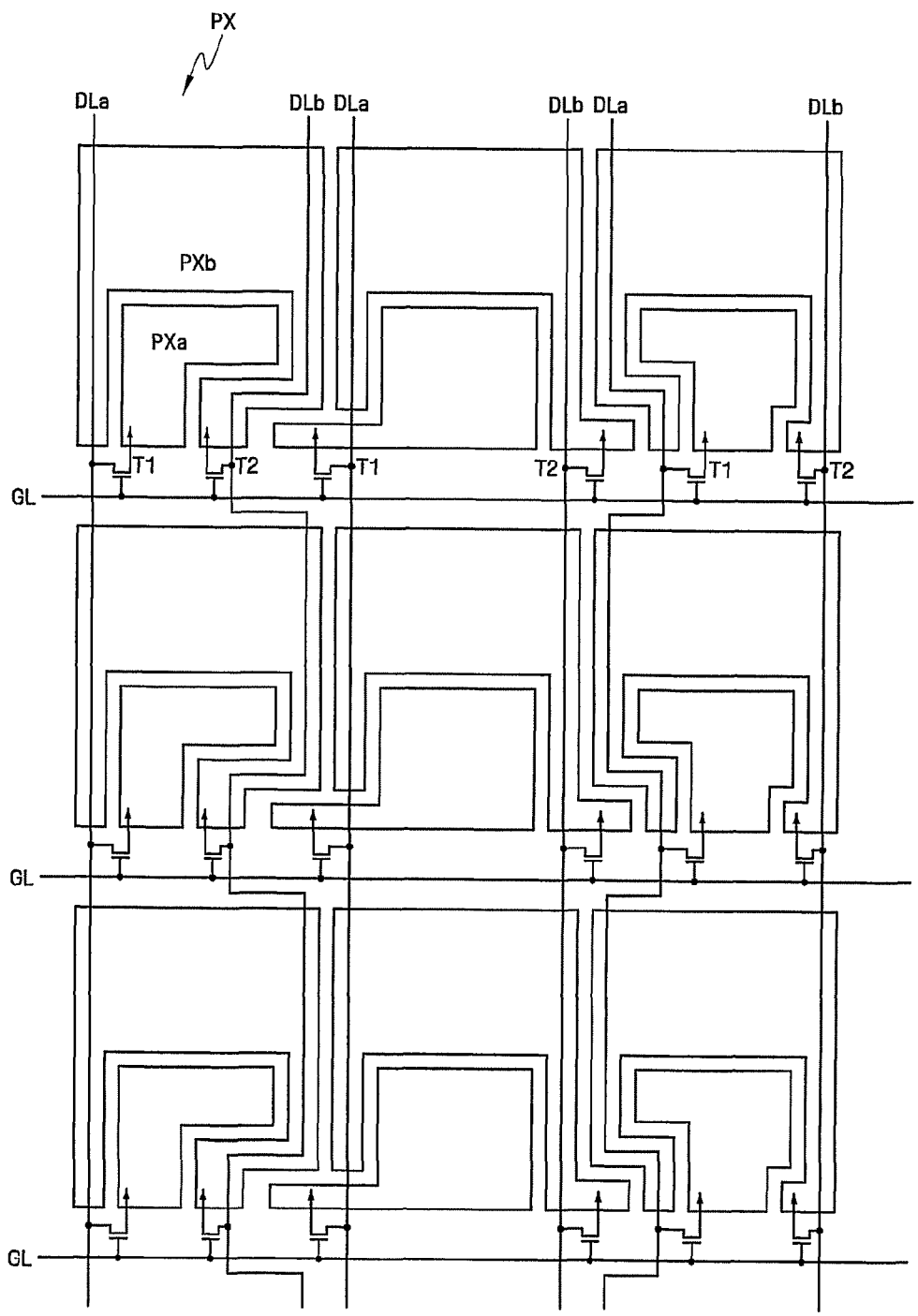
FIG. 1 is a schematic diagram showing an exemplary embodiment of a pixel array of a liquid crystal display ("LCD") according to the present invention.

The invention now will be described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below or beneath. The device may be otherwise oriented and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Exemplary embodiments of a liquid crystal display ("LCD") described in the present specification include pixel electrodes patterned with microelectrodes, and each pixel electrode is split into two subpixel electrodes. However, the present invention can be applied not only to this type of LCD but also to various other types of LCDs, such as LCDs having a patterned vertical alignment ("PVA") structure in which each pixel region includes a plurality of domain partition portions, LCDs having pixel electrodes which are not patterned, and LCDs having pixel electrodes, each of which is not split into subpixel electrodes.

Hereinafter, an exemplary embodiment of an LCD according to the present invention will be described in detail with reference to the attached drawings.

Figure 2:
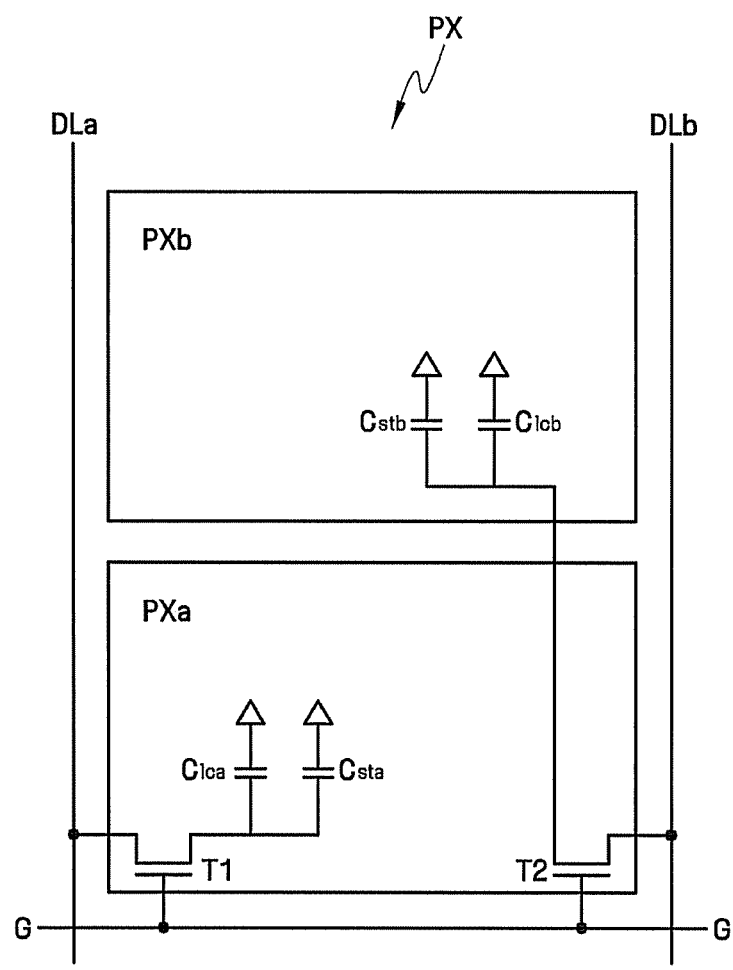
FIG. 2 is an equivalent circuit diagram of an exemplary embodiment of a pixel included in the exemplary embodiment of an LCD of FIG. 1.

FIG. 1 is a schematic diagram showing an exemplary embodiment of a pixel array of an exemplary embodiment of an LCD according to the present invention. FIG. 2 is an equivalent circuit diagram of an exemplary embodiment of a pixel included in the LCD of FIG. 1.

The current exemplary embodiment of an LCD includes a liquid crystal panel assembly, a gate driver (not shown) and a data driver (not shown) which are connected to the liquid crystal panel assembly, a gray voltage generator (not shown) which is connected to the data driver, and a signal controller (not shown) which controls the gate driver and the data driver.

The liquid crystal panel assembly includes a plurality of display signal lines and a plurality of pixels PX, which are connected to the display signal lines and arranged substantially in a matrix shape. The liquid crystal panel assembly also includes first and second substrates facing each other and a liquid crystal layer interposed between the first and second substrates.

Referring to FIGS. 1 and 2, the display signal lines are formed on the first substrate (not shown). The display signal lines include a plurality of gate lines GL for transmitting gate signals and a plurality of first and second data lines DLa and DLb for transmitting data signals. The gate lines GL extend substantially in a row, e.g., horizontal, direction and are substantially parallel to each other. The first and second data lines DLa and DLb extend substantially in a column, e.g., transverse, direction and are substantially parallel to each other. Specifically, the gate lines GL are formed on the first substrate and extend in a first direction. The first and second data lines DLa and DLb are insulated from the gate lines GL and are disposed substantially perpendicular to the gate lines GL to include a plurality of pixel regions. The first and second data lines DLa and DLb extend in a second direction, are separated from each other and are disposed respectively on both sides of each pixel region.

In the present exemplary embodiment, each pixel PX includes a pair of first and second subpixel electrodes PXa and PXb. The first and second subpixel electrodes PXa and PXb are connected to a first and second switching device, respectively. In one exemplary embodiment the first and second switching devices are thin film transistors ("TFTs") T1 and T2 which are connected to the first or second data line DLa or DLb, respectively and one gate line GL. The first and second subpixel electrodes PXa and PXb are formed in each pixel region. In one exemplary embodiment, a relatively high data voltage may be applied to the first subpixel electrode PXa, and a relatively low data voltage may be applied to the second subpixel electrode PXb. In such an exemplary embodiment, a high or low data voltage denotes a large or small difference between a common voltage and the data voltage, respectively.

The pixel regions shown in FIG. 1 include first through third pixel regions arranged successively along a horizontal direction, e.g., a direction of extension of the gate lines. The first pixel region is disposed between the first pair of data lines DLa and DLb and above the gate line GL, the second pixel region is disposed between the next pair of data lines DLa and DLb and above the gate line GL and the third pixel region is disposed between the next pair of data lines DLa and DLb and above the gate line GL. At least one of the first and second TFTs T1 and T2 is disposed on the side of the first and second subpixel electrodes PXa and PXb of the first or second pixel region. Specifically, the first TFT T1 of the second pixel region may be disposed on the side of the first and second subpixel electrodes PXa and PXb of the first pixel region with respect to the first data line DLa of the second pixel region.

That is, each of the first and second TFTs T1 and T2 is connected to one gate line GL and the first or second data line DLa or DLb. In one exemplary embodiment, the positions of the first and second TFTs T1 and T2 in each pixel region vary according to the color of a pixel in each pixel region.

For example, in one exemplary embodiment, a green filter may be disposed in the first pixel region from among the first through third pixel regions arranged successively in the horizontal direction, a blue filter may be disposed in the second pixel region, and a red filter may be disposed in the third pixel region. In such an exemplary embodiment, at least one of the first and second TFTs T1 and T2 of the second pixel region in which the blue filter is disposed may be formed in the direction of a pixel region adjacent to the first or second data line DLa or DLb of the second pixel region, that is, the first or third pixel region. Specifically, the pixel region corresponding to the blue filter may be formed such that the first and second TFTs T1 and T2 which control the pixel electrodes disposed on that pixel region may be formed outside of that pixel region in adjacent pixel regions not corresponding to the blue filter. The disposition of the first and second TFTs T1 and T2 will be described in more detail later with reference to FIG. 3.

The first and second TFTs T1 and T2 may be connected to liquid crystal capacitors Clca and Clcb and storage capacitors Csta and Cstb, respectively. Exemplary embodiments include configurations wherein the storage capacitors Csta and Cstb may be omitted.

Exemplary embodiments of the first or second switching devices T1 and T2 in each subpixel electrode PXa or PXb may be a thin film transistor formed on the first substrate. Specifically, the first or second switching device T1 and/or T2 may be a three-terminal device that includes a control terminal (hereinafter, referred to as a gate electrode) connected to the gate line GL to which a gate signal is transmitted, an input terminal (hereinafter, referred to as a source electrode) connected to the first or second data line DLa or DLb, and an output terminal (hereinafter, referred to as a drain electrode) connected to the liquid crystal capacitor Clca or Clcb and the storage capacitor Csta or Cstb.

The liquid crystal capacitor Clca or Clcb includes the first or second subpixel electrode PXa or PXb in the first substrate and a common electrode in the second substrate (not shown) as two terminals thereof. The liquid crystal layer between the first or second subpixel electrode PXa or PXb and the common electrode functions as a dielectric within the liquid crystal capacitor Clca or Clcb. The first and second subpixel electrodes PXa and PXb are connected to the first and second switching devices T1 and T2, respectively. In one exemplary embodiment, the common electrode is formed on the entire surface of the second substrate, and a common voltage Vcom is applied to the common electrode.

The storage capacitors Csta and Cstb supplement the liquid crystal capacitors Clca and Clcb. Exemplary embodiments of each storage capacitor Csta or Cstb may be composed of storage wiring and one of the first and second subpixel electrodes PXa and PXb, which are formed on the first substrate and overlap each other with an insulator disposed therebetween. A predetermined voltage, such as the common voltage Vcom, may be applied to the storage wiring.

In one exemplary embodiment, each pixel PX may display one of three primary colors (spatial division) or alternative exemplary embodiments include configurations wherein each pixel PX may display the three primary colors at different times (time division) so that a spatio-temporal sum of the three primary colors can produce a desired color which can be recognized by a viewer. In one exemplary embodiment, the three primary colors may be red, green and blue. As an exemplary embodiment of spatial division, each pixel PX may include a color filter representing one of the three primary colors in a region of the second substrate.

The gate driver is connected to the gate lines GL and transmits a gate signal, i.e. a gate on voltage Von or a gate off voltage Voff, to the gate lines GL.

The gray voltage generator may generate two sets of gray voltages (or reference gray voltages) related to pixel transmittance and apply the generated sets of gray voltages to the data driver. That is, the two sets of gray voltages may respectively be independently applied to each pair of subpixels that form each pixel. However, the present invention is not limited thereto. Alternative exemplary embodiments include configurations wherein the gray voltage generator may generate only one set of gray voltages.

The data driver is connected to each pair of the first and second data lines DLa and DLb. The data driver applies a data voltage to any one of a pair of the first and second subpixel electrodes PXa and PXb that form each pixel PX through the first data line DLa and applies a different data voltage to the other one of the first and second subpixel electrodes PXa and PXb through the second data line DLb. In one exemplary embodiment for example, referring to FIG. 1, the first data line DLa of each pixel region applies a first data voltage to the first subpixel electrode PXa, and the second data line DLb applies a second data voltage to the second subpixel electrode PXb.

Exemplary embodiments include configurations wherein the gate driver or the data driver may be directly mounted on the liquid crystal panel assembly in the form of a plurality of driving integrated circuit ("IC") chips or may be mounted on flexible printed circuit films and attached to the liquid panel assembly in the form of tape carrier packages ("TCPs"). Otherwise, exemplary embodiments include configurations wherein the gate driver or the data driver may be integrated into the liquid crystal panel assembly together with the display signal lines, i.e., the gate lines GL and the first and second data lines DLa and DLb, and the first and second switching devices, i.e., the first and second TFTs T1 and T2.

The signal controller controls the operations of the gate driver and the data driver as described above.

Each pixel PX includes two switching devices and the first and second subpixel electrodes PXa and PXb which are connected to the switching devices T1 and T2, respectively. In one exemplary embodiment, a relatively high data voltage may be applied to the first subpixel electrode PXa, and a relatively low data voltage may be applied to the second subpixel electrode PXb. In such an exemplary embodiment, a high or low data voltage denotes a large or small difference between a common voltage and the data voltage, respectively. In one exemplary embodiment, the first and second data lines DLa and DLb may overlap the first and second subpixel electrodes PXa and PXb, and the second subpixel electrode PXb may surround the first subpixel electrode PXa. Thus, the first and second subpixel electrodes PXa and PXb can be prevented from being coupled to the first and second data lines DLa and DLb which are disposed respectively on both sides thereof.

Hereinafter, an exemplary embodiment of an LCD according to a the present invention (the LCD shown in FIG. 1) will be described in additional detail with reference to FIGS. 3 through 5. The LCD according to the current exemplary embodiment includes a first substrate having a TFT array, a second substrate facing the first substrate, and a liquid crystal layer (not shown) interposed between the first and second substrates.

Figure 3:
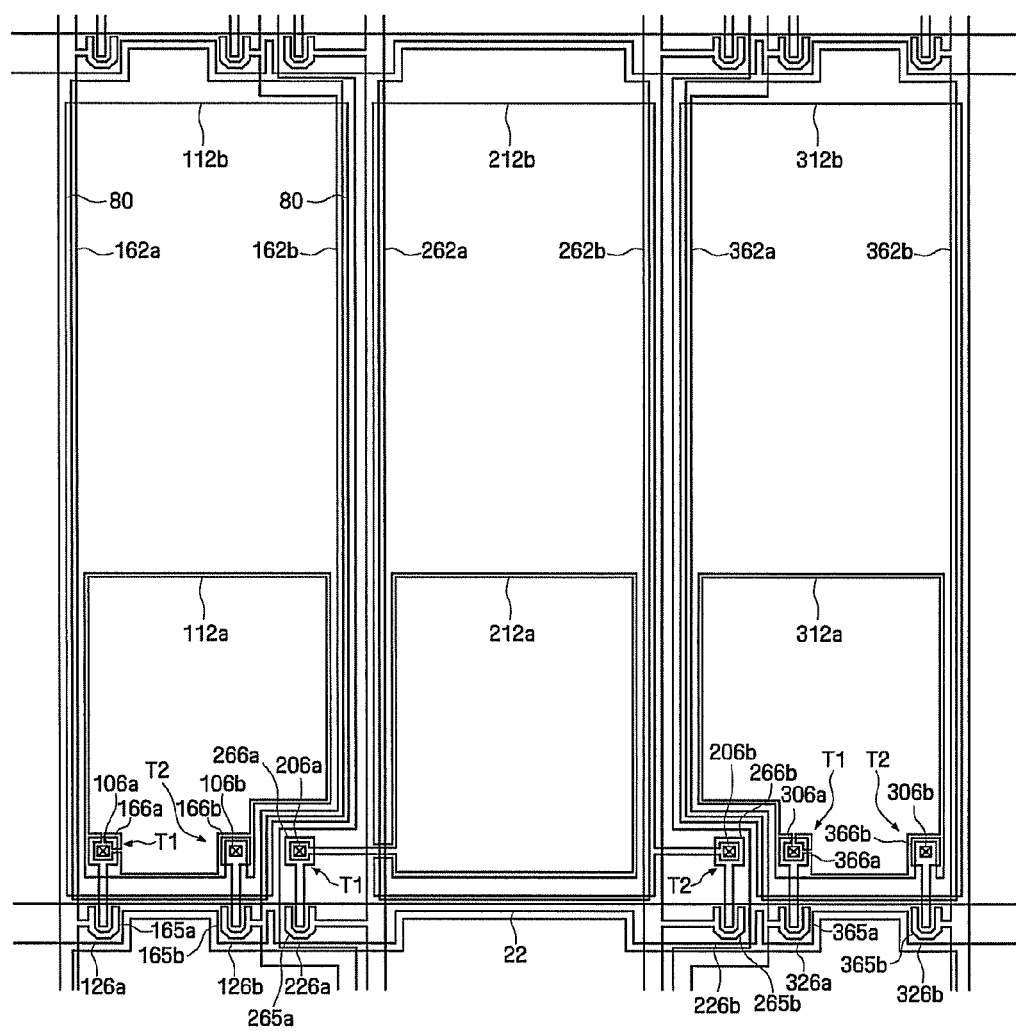
FIG. 3 is a top plan view of an exemplary embodiment of a first substrate, which includes first through third pixel regions arranged sequentially, in an exemplary embodiment of an LCD according to the present invention.

FIG. 3 is a top plan view of the first substrate, which includes first through third pixel regions arranged sequentially in a horizontal direction, in the current exemplary embodiment of an LCD according to the present invention. FIG. 4 is a top plan view of the first substrate including the first pixel region shown in FIG. 3. FIG. 5 is a cross-sectional view of the exemplary embodiment of an LCD taken along line V-V' of FIG. 4. Hereinafter, when an element is not specifically attributed to any one particular pixel region of the first through third pixel regions, it will be understood that the element is commonly included in all of the first through third pixel regions.

Referring to FIG. 3, a plurality of pixel regions include a gate line 22 and first and second data lines 162a, 162b, 262a, 262b, 362a, and 362b. That is, each pixel region includes the gate line 22, which extends in a horizontal direction, and a pair of the first and second data lines, e.g., one of the pairs of data lines 162a and 162b, 262a and 262b, or 362a and 362b which extend in a substantially vertical direction. In one exemplary embodiment, the pixel regions may be bound by the gate lines 22 and the first and second data lines 162a, 162b, 262a, 262b, 362a, and 362b. Therefore, each pixel region may be shaped differently from adjacent pixel regions, according to a shape of the signal wiring included therein, in particular, the shape of the first or second data line 162a or 162b, 262a or 262b, or 362a or 362b.

For example, a pixel region on the left side of FIG. 3 may be the first pixel region, and the other two pixel regions may be the second and third pixel regions, sequentially moving from left to right. In this case, the second pixel region can be a substantially rectangular shape. However, the first pixel region may be shaped like a rectangle having its lower right part distorted by the wiring shape of the second data line 162b.

The gate line 22 transmits a gate signal and extends in a first direction, e.g., a horizontal direction. In addition, the gate line 22 is disposed on an insulating substrate 10, exemplary embodiments of which may be made of transparent glass, plastic or other materials having similar characteristics.

The gate line 22 may include a pair of first and second protruding gate electrodes in each pixel region. For example, the gate line 22 may include a pair of first and second protruding gate electrodes 226a and 226b in the second pixel region. The first gate electrode 226a of the second pixel region from among the first through third pixel regions arranged sequentially in the horizontal direction may be disposed on the same side as first and second subpixel electrodes 112a and 112b of the first pixel region with respect to the first data line 262a.

In addition, the second gate electrode 226b of the second pixel region may be disposed on the same side as first and second subpixel electrodes 312a and 312b with respect to the second data line 262b of the second pixel region. That is, the first and second gate electrodes 226a and 226b of the second pixel region are located outside the second pixel region.

Exemplary embodiments include configurations wherein a storage line (not shown) may be formed on the insulating substrate 10. The storage line may extend horizontally across each pixel region to be substantially parallel to the gate line 22. The storage line may include a storage electrode (not shown) having a predetermined width and connected thereto. The storage electrode may overlap each pair of the first and second subpixel electrodes 112a and 112b, 212a and 212b, or 312a and 312b and thus form a storage capacitor which enhances the charge storage capability of a pixel.

A gate insulating film 30, exemplary embodiments of which may be made of silicon nitride (SiNx) or other material having similar characteristics, is disposed on the gate line 22 and the storage line.

A pair of semiconductor layers 40a and 40b, exemplary embodiments of which may be made of hydrogenated amorphous silicon or polycrystalline silicon or other material with similar characteristics, may be disposed on the gate insulating film 30. The semiconductor layers 40a and 40b may have various shapes. For example, exemplary embodiments include configurations wherein the semiconductor layers 40a and 40b may be islands or may be formed linearly. In the current exemplary embodiment, the semiconductor layers 40a and 40b are island-shaped.

The first and second data lines 162a and 162b, 262a and 262b, and 362a and 362b deliver data voltages and extend in a second direction, e.g., a vertical direction. The first and second data lines 162a and 162b, 262a and 262b, and 362a and 362b are insulated from the gate line 22 and are disposed substantially perpendicularly to the gate line 22 to form a plurality of pixel regions as described above.

For example, the first and second data lines 262a and 262b vertically extend straightly on both sides of the second pixel region, respectively. The first and second data lines 262a and 262b may include first and second source electrodes 265a and 265b which extend toward first and second drain electrodes 266a and 266b over the first and second gate electrodes 226a and 226b, respectively. Each pixel region may include the first and second subpixel electrodes, e.g., the first pixel region includes first and second subpixel electrodes 112a, 112b, the second pixel region includes first and second subpixel electrodes 212a, 212b and the third pixel region includes first and second subpixel electrodes 312a and 312b. The first data line 262a transmits a data signal to any one of the first and second subpixel electrodes 212a and 212b, and the second data line 262b transmits another data signal to the other one of the first and second subpixel electrodes 212a and 212b; in the present exemplary embodiment, the first data line 262a transmits a data signal to the first subpixel electrode 212a and the second data line 262b transmits a data signal to the second subpixel electrode 262b.

Each of the first through third pixel regions arranged sequentially in a horizontal direction includes a first TFT T1 which is connected to the first subpixel electrode 112a, 212a, or 312a and a second TFT T2 which is connected to the second subpixel electrode 112b, 212b, or 312b. The first TFT T1 of the second pixel region may be disposed on the same side as the first and second subpixel electrodes 112a and 112b of the first pixel region with respect to the first data line 262a of the second pixel region.

Likewise, the second TFT T2 of the second pixel region may be disposed on the same side as the first and second subpixel electrodes 312a and 312b of the third pixel region with respect to the second data line 262b of the second pixel region. That is, while the first and second TFTs T1 and T2 of the first pixel region and the first and second TFTs T1 and T2 of the third pixel region are formed inside the first and third pixel regions, respectively, the first and second TFTs T1 and T2 of the second pixel region are formed outside the second pixel region.

Specifically, the first data line 162a, 262a, or 362a and the second data line 162b, 262b, or 362b, which are disposed respectively on both sides of each pixel region, separate the inside of each pixel region from the outside thereof. Thus, since the first and second TFTs T1 and T2 of the first pixel region are disposed on the same side as the first and second subpixel electrodes 112a and 112b of the first pixel region with respect to the first and second data lines 162a and 162b of the first pixel region, the first and second TFTs T1 and T2 of the first pixel region are disposed inside the first pixel region. Similarly, since the first and second TFTs T1 and T2 of the third pixel region are disposed on the same side as the first and second subpixel electrodes 312a and 312b of the third pixel region with respect to the first and second data lines 362a and 362b of the third pixel region, the first and second TFTs T1 and T2 of the third pixel region are disposed inside the third pixel region.

On the other hand, the first TFT T1 of the second pixel region is disposed on the same side as the first and second subpixel electrodes 112a and 112b of the first pixel region and the second TFT T2 of the second pixel region is disposed on the same side as the first and second subpixel electrodes 312a and 312b of the third pixel region with respect to the first and second data lines 262a and 262b. Thus, the first and second TFTs T1 and T2 of the second pixel region are disposed outside the second pixel region.

Each pixel region may also include a first contact, e.g., a contact hole, 106a, 206a or 306a, which electrically connects the first TFT T1 to the first subpixel electrode 112a, 212a or 312a, and a second contact, e.g., a contact hole, 106b, 206b or 306b which electrically connects the second TFT T2 to the second subpixel electrode 112b, 212b, or 312b.

The positions of the first and second contacts 106a and 106b, 206a and 206b, or 306a and 306b may vary in each of the first through third pixel regions arranged sequentially in a horizontal direction. Specifically, the first and second contacts 106a and 106b of the first pixel region may be formed inside the first pixel region, and the first and second contacts 306a and 306b of the third pixel region may be formed inside the third pixel region. On the other hand, the first and second contacts 206a and 206b of the second pixel region may be formed outside the second pixel region.

In one exemplary embodiment, any one of a green filter and a red filter may be disposed in the first pixel region, and the other one of the green filter and the red filter may be disposed in the third pixel region. In addition, a blue filter may be disposed in the second pixel region. The current exemplary embodiment of an LCD may have a color filter on array ("COA") structure in which the green, red, and blue filters are formed on the insulating substrate 10, e.g., on a TFT substrate, instead of on a common electrode or opposing substrate (not shown) separated from the TFT substrate by the liquid crystal layer. When the blue filter is disposed in the second pixel region, the first and second TFTs T1 and T2 and the first and second contacts 206a and 206b of the second pixel region may be disposed outside the second pixel region, thereby increasing an area of the blue filter through which light passes.

Therefore, even when accurate color capture ("ACC") is performed to correct a white balance, it does not cause a gamma value of the blue filter to become different from gamma values of the red and green filters. Here, a ratio of a first subpixel electrode to a second subpixel electrode in each pixel region or the material, component or thickness of a color filter may be unchanged. That is, the display quality of the LCD can be improved only by changing the positions of TFTs and/or contacts.

In FIG. 3, the first and second TFTs T1 and T2 and the first and second contacts 206a and 206b of the second pixel region are all formed outside the second pixel region. However, alternative exemplary embodiments also include configurations wherein any one of the first and second TFTs T1 and T2 or any one of the first and second contacts 206a and 206b may be formed within the second pixel region, such an alternative exemplary embodiment would still allow for an expanded second pixel region even if some of the driving circuitry elements were disposed within the second region.

The arrangement relationship between the first and second data lines 162a and 162b of the first pixel region and the first data line 262a of the second pixel region will now be described with reference to FIG. 4. For ease of description, an area around only the first subpixel electrode 112a of the first pixel region is shown in FIG. 4. However, exemplary embodiments include configurations wherein an area around the third pixel region may be configured substantially the same as the area shown in FIG. 4.

Figure 4:
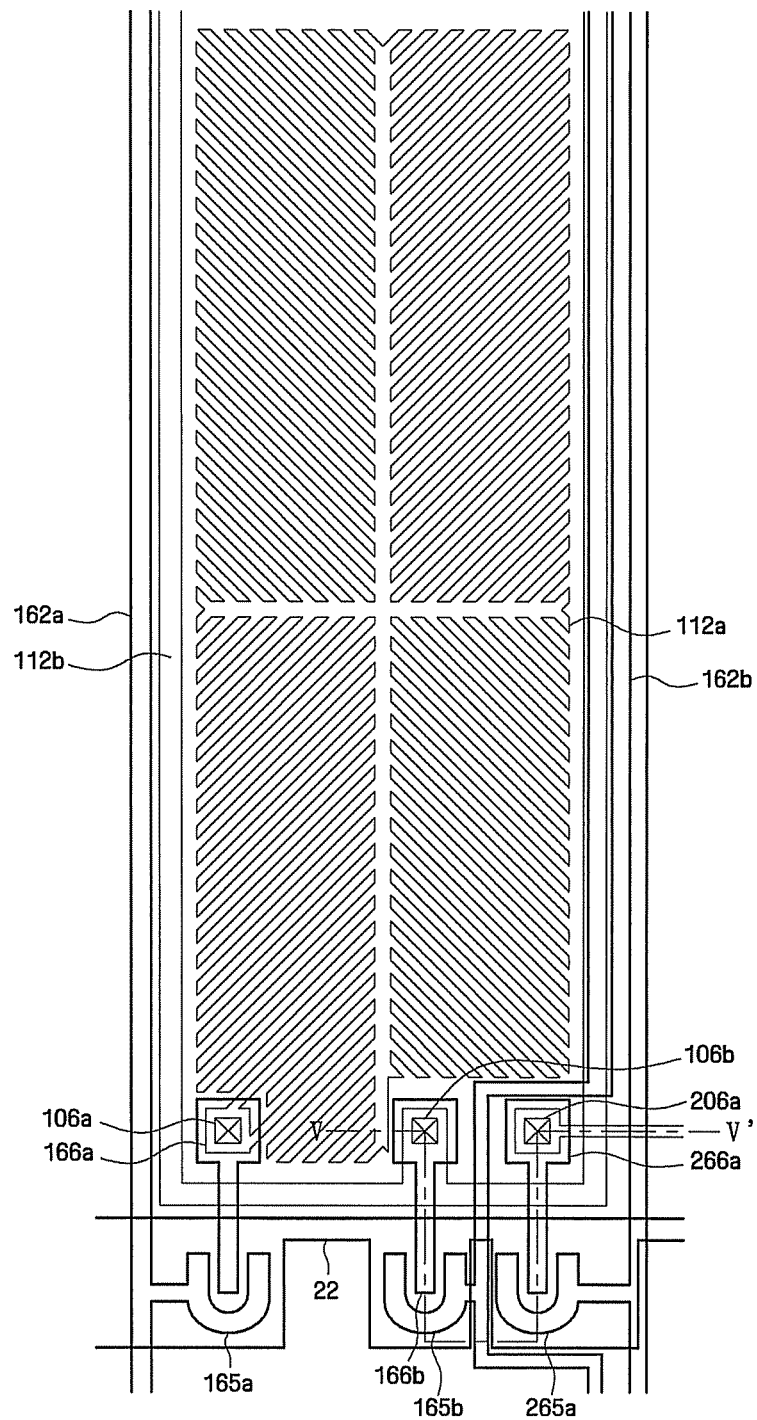
FIG. 4 is a top plan view of the exemplary embodiment of a first substrate including the first pixel region shown in FIG. 3.

Referring to FIG. 4, exemplary embodiments of the first subpixel electrode 112a may be formed in a slit pattern. The first pixel region may be defined by the first and second data lines 162a and 162b and the gate line 22, and a color filter corresponding to the first pixel region may be formed in the first pixel region. For example, in one exemplary embodiment the green or red filter may be formed in the first pixel region.

The first TFT T1 of the second pixel region may be formed between the first data line 262a, which is disposed on a first side (e.g., a left side) of the second pixel region, and the second data line 162b which is disposed on a second side (e.g., a right side) of the first pixel region. Here, the first and second sides of each pixel region, e.g., the first pixel region, may denote both sides thereof on which the first and second data lines 162a and 162b are disposed, respectively.

For example, in one exemplary embodiment when a right side of the first pixel region on which the second data line 162 of the first pixel region is disposed is the first side, a left side of the first pixel region on which the first data line 162a of the first pixel region is disposed may be the second side. Therefore, the second data line 162b of the first pixel region and the first data line 262a of the second pixel region may be located adjacent to each other and extend substantially parallel to each other, as shown in FIG. 4.

In addition, an area in which the second data line 162b of the first pixel region and the first data line 262a of the second pixel region are separated from each other by a first distance and extend substantially parallel to each other may be referred to as a first area, and an area in which the second data line 162b of the first pixel region and the first data line 262a of the second pixel region are separated from each other by a second distance which is greater than the first distance and extend substantially parallel to each other may be referred to as a second area. In such an exemplary embodiment, the first TFT T1 and/or the first contact 206a of the second pixel region may be interposed between the two data lines 162b and 262a in the second area.

That is, the second data line 162b of the first pixel region and the first data line 262a of the second pixel region may surround the first TFT T1 and/or the first contact 206a of the second pixel region. Specifically, the first data line 262a of the second pixel region may extend substantially straight in the second direction, e.g., the vertical direction, and the second data line 162b of the first pixel region may surround three sides of the first TFT T1 of the second pixel region in a "C" shape. Specifically, while the first data line 262a of the second pixel region extends substantially straightly in the second direction, the second data line 162b of the first pixel region extends substantially in the second direction in the first area, then in the second area the second data line 162b extends in the first direction, e.g., horizontally, then extends perpendicularly in the second direction again, then extends perpendicularly again in the first direction, before continuing again to extend substantially parallel to the first data line 262a in the second direction along the first area of an adjacent pixel in the vertical direction.

As described above, the first TFT T1 of the second pixel region is connected to the first subpixel electrode 212a of the second pixel region by the first contact 206a. Here, the first TFT T1 and the first contact 206a of the second pixel region are formed outside the second pixel region, that is, formed on the left side of the first data line 262a of the second pixel region. Thus, the first subpixel electrode 212a of the second pixel region may overlap, e.g., be aligned with, the first data line 262a as seen from a top plan view. That is, the first subpixel electrode 212a of the second pixel region may be insulated from the first data line 262a of the second pixel region and overlap the first data line 262a of the second pixel region to be electrically connected to the first TFT 1 of the second pixel region. As shown in FIG. 4, a drain electrode 266a of the first TFT 1 of the second pixel region overlaps the first data line 262a of the second pixel region.

Figure 5:
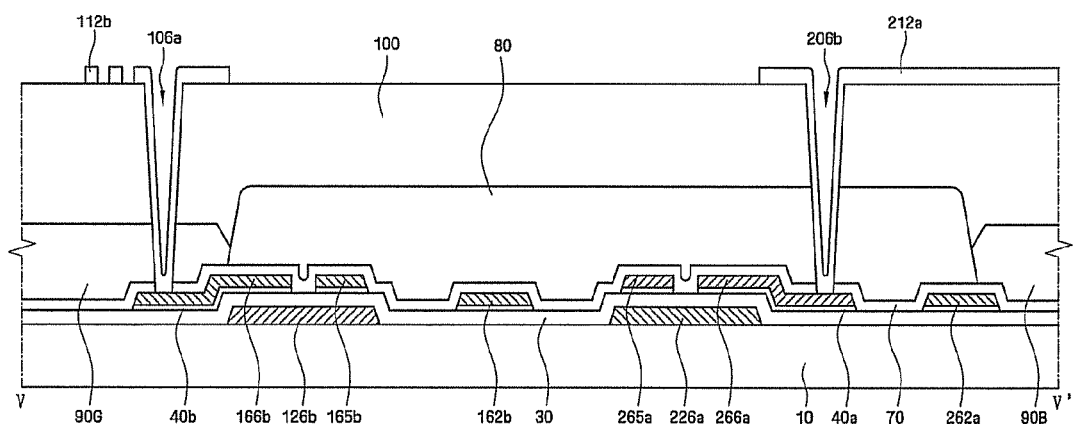
FIG. 5 is a cross-sectional view of the exemplary embodiment of an LCD taken along line V-V' of FIG. 4.

Referring to FIG. 5, the first TFT T1 (including the first source electrode 265a, a first gate electrode 226a, and the first drain electrode 266a) of the second pixel region may be interposed between the second data line 162b of the first pixel region and the first data line 262a of the second pixel region.

In addition, at least a portion of the source electrodes 165b and 265a of the second TFT 2 of the first pixel region and the first TFT 1 of the second pixel region may overlap the semiconductor layers 40b and 40a, respectively. The drain electrodes 166b and 266a may respectively face the source electrodes 165b and 265a with respect to the gate electrodes 126b and 226a, and at least a portion of the drain electrodes 166b and 266a may overlap the semiconductor layers 40b and 40a, respectively.

A passivation layer 70 may be formed on the insulating substrate 10 having the gate line 22, the data lines 162b and 262a, and the first and second TFTs T1 and T2 formed thereon.

The subpixel electrodes 112b and 212a may be formed on the passivation layer 70. The subpixel electrodes 112b and 212a correspond to their respective pixel regions and are electrically connected to the drain electrodes 166b and 266a by the contacts 106b and 206a, respectively. Exemplary embodiments of the subpixel electrodes 112b and 212a may be made of transparent conductors, exemplary embodiments of which include indium tin oxide ("ITO"), indium zinc oxide ("IZO"), reflective conductors such as aluminum, or other similar materials.

The subpixel electrodes 112b and 212a may be physically and electrically connected to the drain electrodes 166b and 266a by the contacts 106b and 206a, respectively. Therefore, the subpixel electrodes 112b and 212a may be supplied with different data voltages from the drain electrodes 166b and 266a, respectively.

The subpixel electrodes 112b and 212a, to which different data voltages are applied, generate an electric field together with a common electrode in the second substrate (not shown), thereby determining the arrangement of liquid crystal molecules disposed between the subpixel electrodes 112b and 212a and the common electrode. Here, exemplary embodiments of the common electrode may be patternless, that is, may not be patterned. Exemplary embodiments of the common electrode may include configurations wherein the common electrode is disposed over substantially an entire surface of the second substrate.

Each subpixel electrode and the common electrode form a liquid crystal capacitor Clca or Clcb and thus, sustain a voltage applied thereto even after the first or second TFT T1 or T2 is turned off. Exemplary embodiments include configurations wherein storage capacitors Csta and Cstb may be connected, in parallel, to the liquid crystal capacitors Clca and Clcb to strengthen a voltage sustaining capability. Each of the storage capacitors Csta and Cstb may be formed of an overlap of the storage wiring with either the subpixel electrode 112b or 212a, or the drain electrode 166b or 266a connected to the subpixel electrode 166b or 266a.

Exemplary embodiments include configurations wherein an alignment film (not shown), which can align the liquid crystal layer, may be coated on the subpixel electrodes 112b and 212a and the passivation layer 70. In addition, a black matrix 80 may be formed on the insulating substrate 10 to prevent the leakage of light and define a pixel region. For example, in one exemplary embodiment the black matrix 80 may be disposed in a region defined by the gate line 22, the data lines 162b and 262a, and including an area of a TFT. The black matrix 80 may have various shapes in order to prevent the leakage of light in regions around the subpixel electrodes 112b and 212a and the TFT. In one exemplary embodiment, the black matrix 80 may be made of metal, including a metal oxide, such as chrome or chrome oxide, or organic black resist or other materials with similar characteristics.

The red, green and blue filters may be sequentially arranged in the pixel region between portions of the black matrix 80.

In the current exemplary embodiment of an LCD, TFTs and/or contacts of the second pixel region, in particular, a pixel region in which the blue filter is disposed, are placed outside the pixel region. Thus, the amount of light that can pass through the blue filter can be increased, which, in turn, prevents a gamma value corresponding to blue from becoming different from gamma values corresponding to red and green after the ACC correction is performed. Consequently, the display quality of the LCD can be improved.

Figure 6:
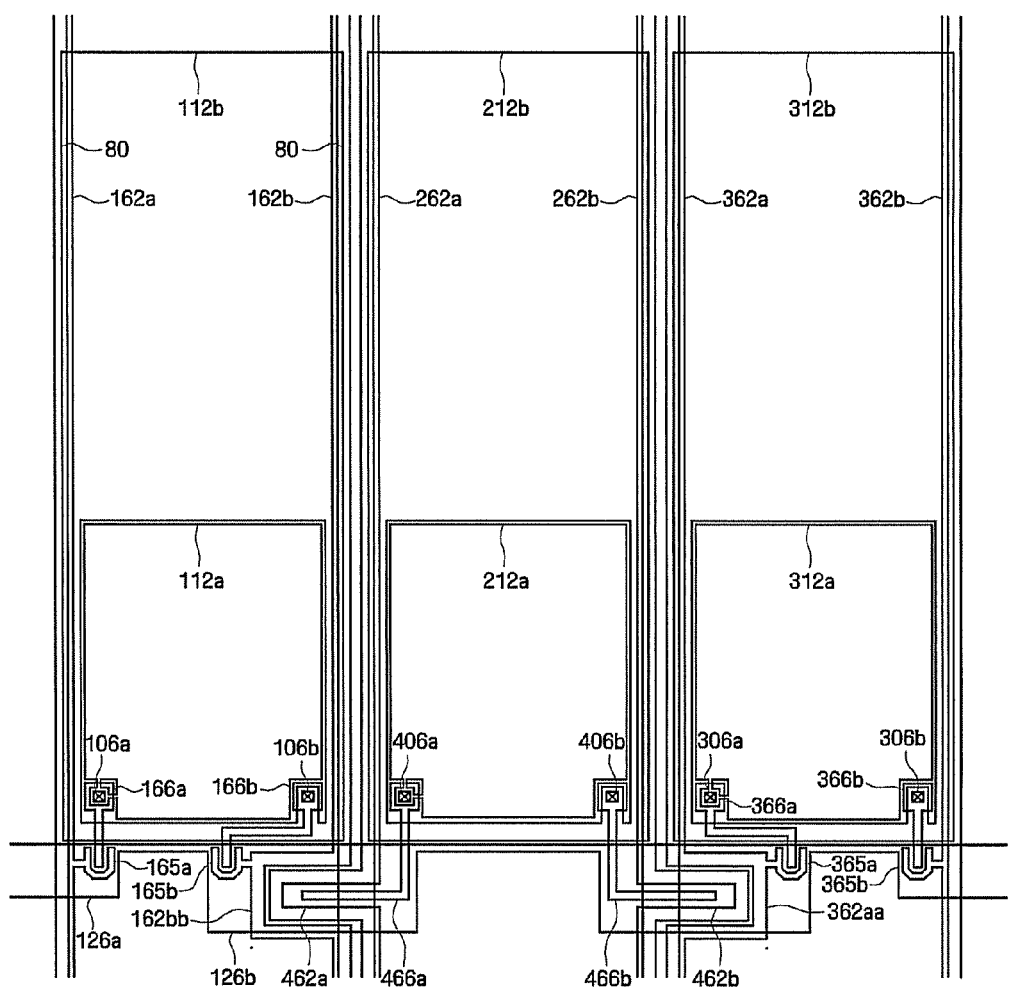
FIG. 6 is a top plan view showing another exemplary embodiment of a first substrate of an LCD according to the present invention.

Hereinafter, another exemplary embodiment of an LCD according to the present invention will be described in detail with reference to FIG. 6. FIG. 6 is top plan view showing an exemplary embodiment of a first substrate of another exemplary embodiment of an LCD according to the present invention. The current exemplary embodiment of an LCD is different from the previous exemplary embodiment of an LCD in that it includes a protruding portion in which a first data line of a second pixel region and a second data line of a first pixel region surround a first TFT of the second pixel region in a "U" shape. For simplicity, a description of elements substantially identical to those of the previous exemplary embodiment will be omitted or simplified, and differences between the current and previous exemplary embodiments will mainly be described.

Referring to FIG. 6, the current exemplary embodiment of an LCD includes a gate line 22, first and second data lines 162a, 162b, 262a, 262b, 362a, and 362b, and first and second TFTs T1 and T2, and first and second subpixel electrodes 112a, 112b, 212a, 212b, 312a, and 312b. The gate line 22 is formed on a first substrate and extends in a first direction. The first and second data lines 162a, 162b, 262a, 262b, 362a, and 362b are insulated from the gate line 22 and are disposed substantially perpendicular to, and cross over, the gate line 22 to form a plurality of pixel regions. In addition, a pair of the first and second data lines 162a and 162b, 262a and 262b, or 362a and 362b are disposed respectively on both sides of each pixel region and extend in a second direction. The first and second TFTs T1 and T2 are connected respectively to each pair of the first and second data lines 162a and 162b, 262a and 262b, or 362a and 362b. Each pair of the first and second subpixel electrodes 112a and 112b, 212a and 212b, or 312a and 312b are connected to the first and second TFTs T1 and T2, respectively.

The pixel regions shown in FIG. 6 include first and second pixel regions arranged successively in a horizontal, e.g., first, direction. The first data line 262a of the second pixel region and the second data line 162b of the first pixel region surround the first TFT T1 of the second pixel region in a "U" shape.

Here, a blue filter may be disposed in the second pixel region, and any one of a green filter and a red filter may be disposed in the first pixel region.

First and second drain electrodes 466a and 466b of the first and second TFTs T1 and T2 of the second pixel region may be inserted into U-shaped first and second source electrodes 462a and 462b of the first and second data lines 262a and 262b of the second pixel region. As shown in FIG. 6, the first and second data lines 262a and 262b of the second pixel region diverge from a straight path to form the first and second source electrodes 462a and 462b; this is different than the previously described exemplary embodiment wherein the source electrodes 265a and 265b extended from the respective data lines as shown in FIGS. 3 and 4.

Although not shown in the drawing, alternative exemplary embodiments include configurations wherein the first and second source electrodes 462a and 462b of the second pixel region may also protrude from the first and second data lines 262a and 262b of the second pixel region.

Figure 7:
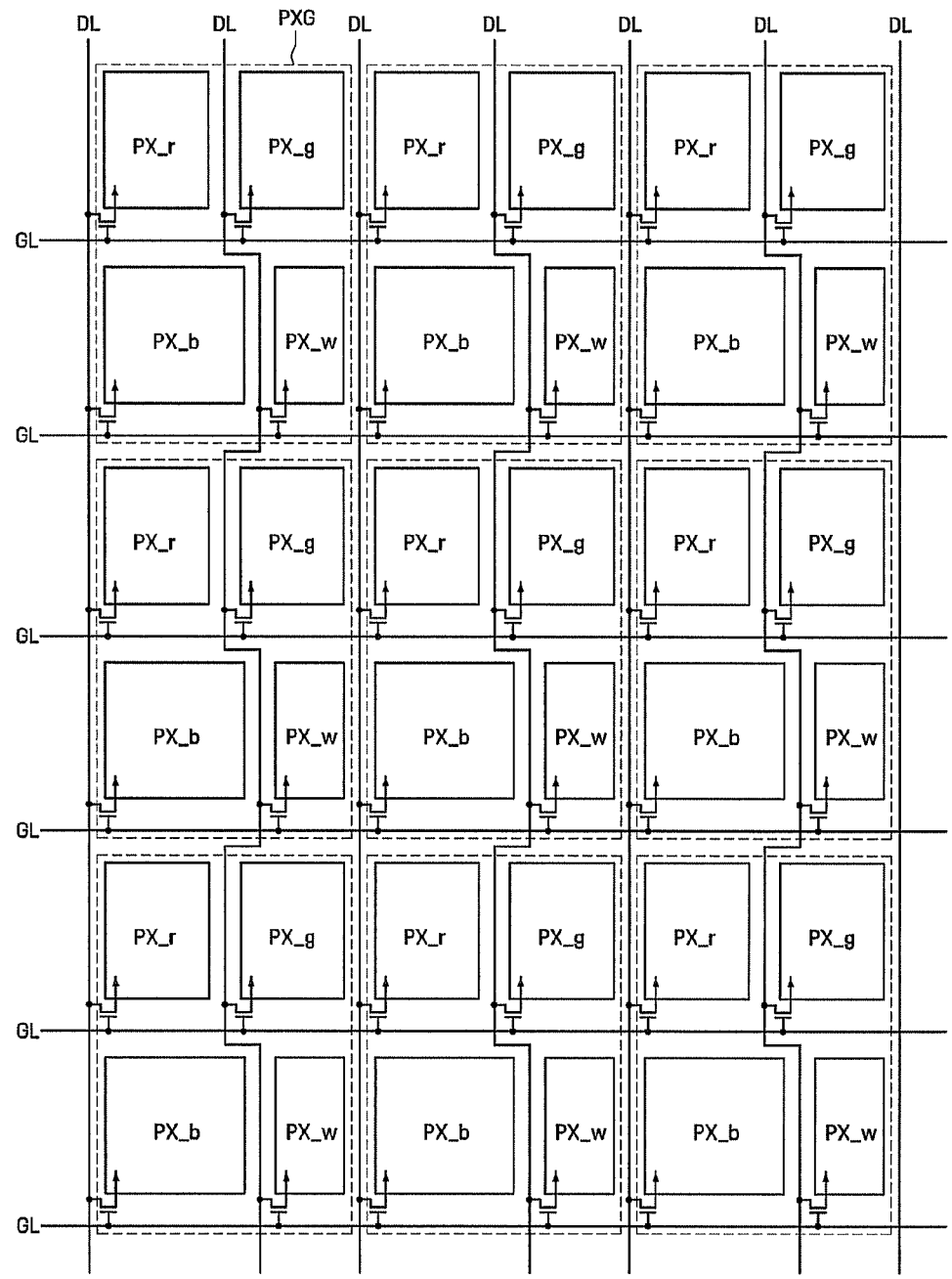
FIG. 7 is a schematic diagram showing another exemplary embodiment of a pixel array of an LCD according to the present invention.
Figure 8:
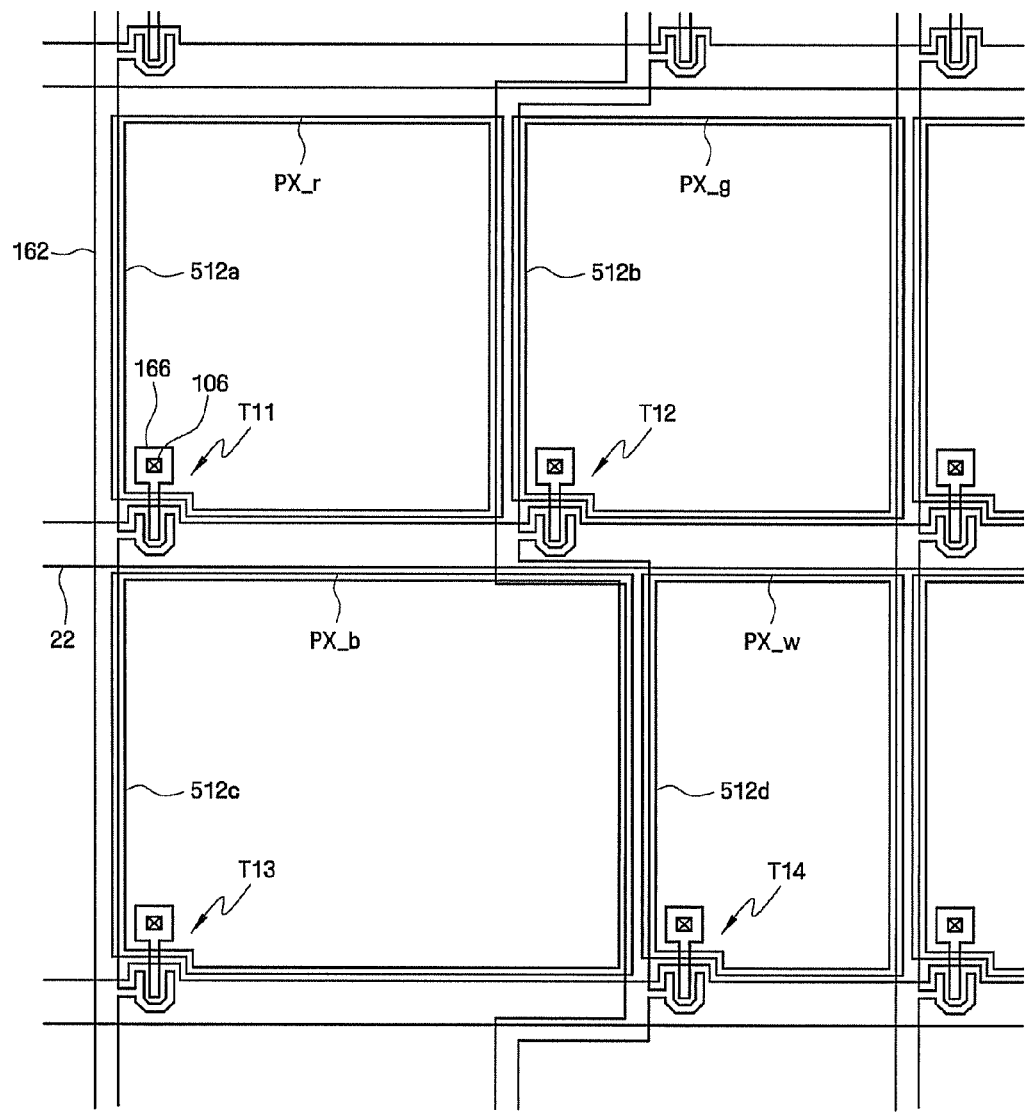
FIG. 8 is a top plan view of an exemplary embodiment of a first substrate including a first pixel group shown in FIG. 7.

Hereinafter, another exemplary embodiment of an LCD according to the present invention will be described in detail with reference to FIGS. 7 and 8. FIG. 7 is a schematic diagram showing an exemplary embodiment of a pixel array of another exemplary embodiment of an LCD according to the present invention. FIG. 8 is a top plan view of a first substrate including a first pixel group shown in FIG. 7. The current exemplary embodiment of an LCD is different from the previous exemplary embodiments of LCDs in that a blue pixel is larger than red, green, and white pixels. For simplicity, a description of elements substantially identical to those of the previous exemplary embodiments will be omitted or simplified, and differences between the current and previous exemplary embodiments will mainly be described.

Referring to FIG. 7, the current exemplary embodiment of an LCD includes a plurality of gate lines GL, a plurality of data lines DL, and a plurality of pixels which are divided into a plurality of pixel groups PXG. Each pixel group PXG includes a blue pixel PX_b, a red pixel PX_r, a green pixel PX_g, and a white pixel PX_w. In the present exemplary embodiment the blue pixel PX_b is larger than the red pixel PX_r, the green pixel PX_g, and the white pixel PX_w.

Specifically, referring to FIG. 8, a gate line 22 extends in a first direction and transmits a gate signal to each of the red pixel PX_r the green pixel PX_g, and another gate line disposed subsequent to the gate line 22 extends in the first direction and transmits a gate signal to each of the blue pixel PX_b and the white pixel PX_w of a single pixel group PXG. A data line 162 is insulated from the gate lines 22 and extends substantially perpendicularly to the gate line 22 to extend in a second direction which is different from the first direction. One data line 162 transmits a data signal to each of the red pixel PX_r and, the blue pixel PX_b and another data line 162 transmits a data signal to each of the green pixel PX_g and the white pixel PX_w of a single pixel group PXG. In addition, TFTs T11 through T14 may be connected to the red pixel PX_r, the green pixel PX_g, the blue pixel PX_b, and the white pixel PX_w, respectively. Each of the red pixel PX_r, the green pixel PX_g, the blue pixel PX_b, and the white pixel PX_w displays an image based on a gate signal and a data signal received respectively from the gate lines 22 and the data lines 162. The red, green, blue, and white pixels PX_r, PX_g, PX_b, and PX_w are divided into a plurality of pixel groups PXG. That is, each pixel group PXG includes a number of pixels.

Specifically, each pixel group PXG includes the blue pixel PX_b, the red pixel PX_r, the green pixel PX_g, and the white pixel PX_w. Here, the blue pixel PX_b, the red pixel PX_r, the green pixel PX_g, and the white pixel PX_w are arranged in a matrix, and the blue pixel PX_b is larger than the red pixel PX_r, the green pixel PX_g, and the white pixel PX_w.

Referring to FIG. 7, each pixel group PXG may include a first row in which the red pixel PX_r and the green pixel PX_g are arranged and a second row in which the blue pixel PX_b and the white pixel PX_w are arranged. In the present exemplary embodiment, the blue pixel PX_b is larger than the red pixel PX_r, the green pixel PX_g and the white pixel PX_w, and the white pixel PX_w is smaller than the red pixel PX_r and the green pixel PX_g, although the invention is not limited thereto.

For example, in one exemplary embodiment the red pixel PX_r may be disposed on the left in a first row of one pixel group PXG, and the green pixel PX_g may be disposed on the right in the first row of the first pixel group PXG1. In addition, the blue pixel PX_B may be disposed on the left in a second row below the first row, and the white pixel PX_w may be disposed on the right in the second row of the first pixel group PXG1.

A portion of a pixel region occupied by the red pixel PX_r and the green pixel PX_g, e.g., a width of the pixel region in a row direction, may be substantially equal to a portion of the pixel region occupied by the blue pixel PX_b and the white pixel PX_w, e.g., a width of the pixel region in the row direction. That is, a portion of a pixel region occupied by pixels arranged in the first row may be substantially equal to a portion of the pixel region occupied by pixels arranged in the second row.

In addition, as described above, in one exemplary embodiment the blue pixel PX_b is larger than the red pixel PX_r and the green pixel PX_g, and the white pixel PX_w is smaller than the red pixel PX_r and the green pixel PX_g. Therefore, the size of the white pixel PX_w can be reduced by the difference between the size of the blue pixel PX_b and the green or red pixel PX_g or PX_r.

Referring to FIG. 8, the blue pixel PX_b is larger than the red pixel PX_r and the green pixel PX_g, and the white pixel PX_w is smaller than the red pixel PX_r and the green pixel PX_g. For example, when the combined width of the red pixel PX_r and the green pixel PX_g is 10 arbitrary units, the width of the red pixel PX_r may be 5 arbitrary units, and the width of the green pixel PX_g may be 5 arbitrary units. In such an exemplary embodiment, the width of the blue pixel PX_b may be greater than 5 arbitrary units but less than 10 arbitrary units, and the width of the white pixel PX_w may be less than 5 arbitrary units but greater than 0 arbitrary units. For example, in one exemplary embodiment when the blue pixel PX_b is formed to a width of approximately 6 arbitrary units to 8 arbitrary units, the white pixel may be formed to a width of approximately 2 arbitrary units to 4 arbitrary units based on the width of the blue pixel PX_b. In the current exemplary embodiment, the size of each pixel is adjusted by controlling the width of each pixel. However, the present invention is not limited thereto, and the size of each pixel can also be adjusted by controlling other dimensions of the pixels, e.g., the height of each pixel.

Since the blue pixel PX_b is larger than the red pixel PX_r and the green pixel PX_g, the wiring structure of data lines may be changed accordingly. Referring to FIG. 8, at least one of data lines coupled to a plurality of pixels included in each pixel group PXG may have a protruding portion which extends outwardly from the remaining portion of the data line in the first direction. That is, a data line that passes between pixels arranged in the first row of each pixel group PXG, for example, the red pixel PX_r and the green pixel PX_g, may have a protruding portion which is bent in a "C" shape to pass between pixels arranged in the second row, for example, the blue pixel PX_b and the white pixel PX_w.

In the exemplary embodiment shown in the drawings, a data line that passes through the center of each pixel group PX has a protruding portion. However, alternative exemplary embodiments a data line that passes between adjacent pixel groups PXG may also have a protruding portion, depending on the disposition of each pixel. Alternative exemplary embodiments include configurations wherein a data line that passes through the center of each pixel group PXG and a data line that passes between adjacent pixel groups PXG may all have protruding portions.

In the exemplary embodiment shown in the drawings, the red pixel PX_r and the green pixel_g are arranged sequentially from left to right in the first row of each pixel group PXG. However, alternative exemplary embodiments include configurations wherein the green pixel PX_g may be disposed on the left in the first row of each pixel group PXG, and the red pixel PX_r may be disposed on the right. In addition, exemplary embodiments include configurations wherein the green pixel PX_g may be disposed on the left in the first row of the first pixel group PXG1, and the red pixel PX_r may be disposed on the right. Then, the red pixel PX_r may be disposed on the left in the first row of another pixel group PXG adjacent to the first pixel group PXG1, and the green pixel PX_g may be disposed on the right.

Likewise, the blue pixel PX_b and the white pixel PX_w may be disposed at various positions in the second row of each pixel group PXG. That is, in the exemplary embodiment shown in the drawings, the blue pixel PX_b is disposed on the left in the second row of each pixel group PXG, and the white pixel PX_w is disposed on the right. However, alternative exemplary embodiments include configurations wherein the blue pixel PX_b may be disposed on the right in the second row of each pixel group PXG, and the white pixel PX_w may be disposed on the left. In addition, exemplary embodiments include configurations wherein the blue pixel PX_b may be disposed on the left in the second row of the first pixel group PXG1, and the white pixel PX_w may be disposed on the right. Then, the blue pixel PX_b may be disposed on the right in the second row of another pixel group PXG adjacent to the first pixel group PXG1, and the white pixel PX_w may be disposed on the left.

In the exemplary embodiment illustrated in FIG. 7, the first row in which the red pixel PX_r and the green pixel PX_g are arranged is an upper row of each pixel group PXG, and the second row in which the blue pixel PX_b and the white pixel PX_w are arranged is a lower row of each pixel group PXG. However, alternative exemplary embodiments include wherein the opposite configuration is also possible. In addition, an upper row of the first pixel group PXG1 may be the first row, and a lower row thereof may be the second row. Then, an upper row of a pixel group PXG adjacent to the first pixel group PXG1 may be the second row, and a lower row thereof may be the first row.

According to the current exemplary embodiment, a blue pixel is formed larger than other pixels, e.g., a red pixel and a green pixel, by adjusting sizes of the blue pixel and a white pixel in a complementary manner. Therefore, even when the ACC correction is performed, it does not cause a gamma value corresponding to the blue pixel from becoming different from a gamma value corresponding to the red or green pixel. In addition, since the size of the white pixel is reduced in size by an amount corresponding to an increase in size of the blue pixel over the red or green pixels, broken fonts on the screen can be prevented, and color repeatability can be increased.

Figure 9:
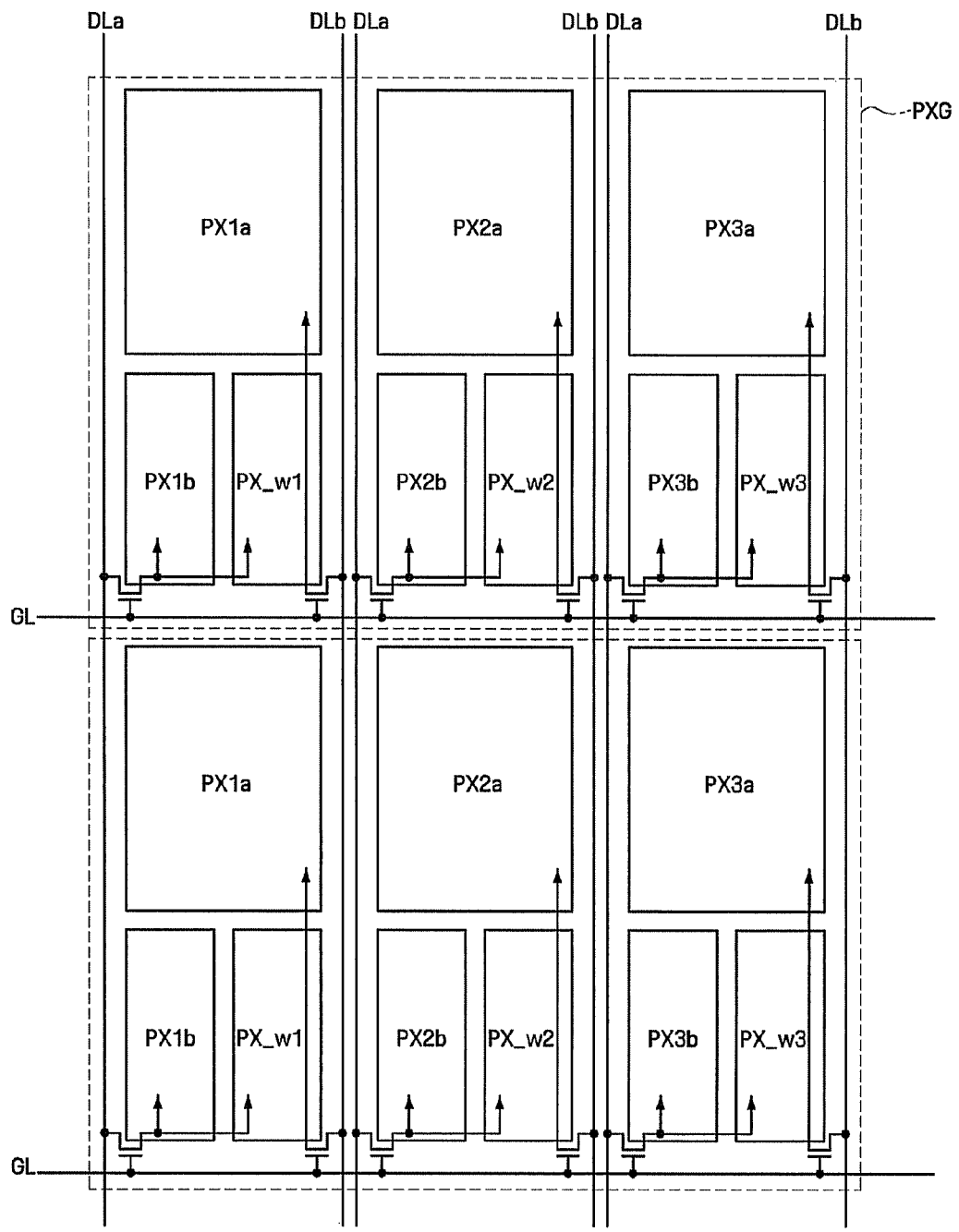
FIG. 9 is a schematic diagram showing another exemplary embodiment of a pixel array of an LCD according to the present invention.
Figure 10:
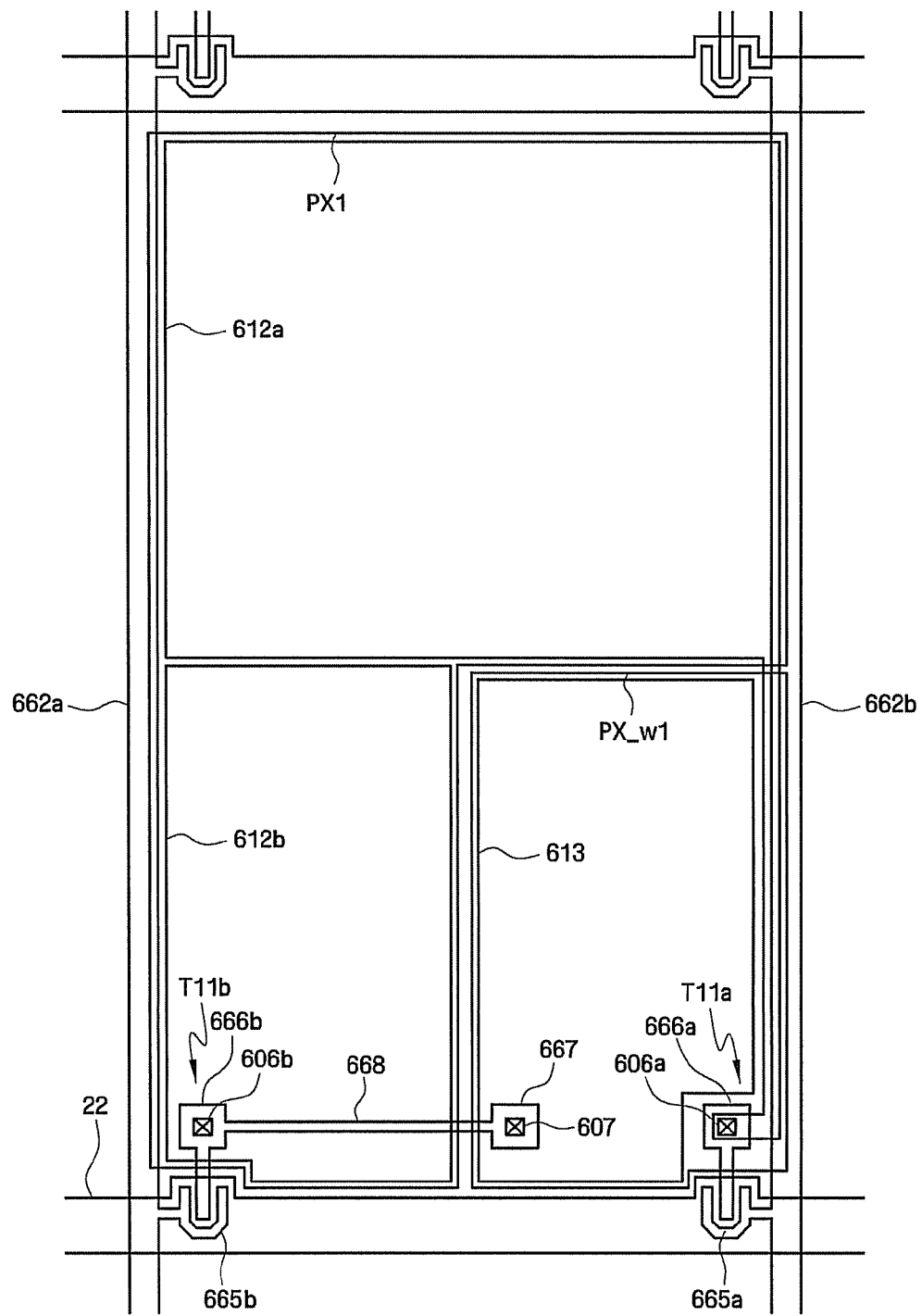
FIG. 10 is a top plan view of an exemplary embodiment of a first substrate including part of a first pixel group shown in FIG. 9.

Hereinafter, another exemplary embodiment of an LCD according to the present invention will be described in detail with reference to FIGS. 9 and 10. FIG. 9 is a schematic diagram showing another exemplary embodiment of a pixel array of another exemplary embodiment of an LCD according to the present invention. FIG. 10 is a top plan view of a first substrate including part of a first pixel group shown in FIG. 9. The present exemplary embodiment of an LCD is different from the previous exemplary embodiments of LCDs in that white pixels are alternately interposed between subpixels of first through third pixels arranged sequentially in a horizontal direction. For simplicity, a description of elements substantially identical to those of the previous exemplary embodiments will be omitted or simplified, and differences between the current and previous embodiments will mainly be described.

Referring to FIG. 9, the current exemplary embodiment of an LCD includes a plurality of gate lines GL, a plurality of data lines DLa and DLb, and a plurality of pixels which are divided into a plurality of pixel groups PXG. Each pixel group PXG includes first through third white pixels PX_w1 through PX_w3 and first through third pixels PX1 through PX3 which are arranged sequentially in a horizontal direction. Each of the first through third pixels PX1 through PX3 includes first and second subpixels PX1a and PX1b, PX2a and PX2b, or PX3a and PX3b. The first through third white pixels PX_w1 through PX_w3 are alternately interposed between the second subpixels PX1b through PX3b of the first through third pixels PX1 through PX3 in the horizontal direction.

The first through third pixels PX1 through PX3 are arranged sequentially along the horizontal direction in each pixel group PXG, and each of the first through third pixels PX1 through PX3 includes the first and second subpixels PX1a and PX1b, PX2a and PX2b, or PX3a and PX3b. Exemplary embodiments include configurations wherein a voltage level of a first data signal transmitted to the first subpixel PX1a, PX2a, or PX3a may be lower than that of a second data signal transmitted to the second subpixel PX1b, PX2b, or PX3b. In one exemplary embodiment, the first pixel PX1 may be a red pixel, the second pixel PX2 may be a green pixel, and the third pixel PX3 may be a blue pixel.

The first subpixels PX1a through PX3a of the first through third pixels PX1 through PX3 may be wider than the second subpixels PX1b through PX3b thereof. As shown in the drawing, the second subpixels PX1b through PX3b of the first through third pixels PX1 through PX3 are smaller than the first subpixels PX1a through PX3a thereof. Thus, the first white pixel PX_w1 may be interposed between the second subpixel PX1b of the first pixel PX1 and the second subpixel PX2b of the second pixel PX2. The second white pixel PX_w2 may be interposed between the second subpixel PX2b of the second pixel PX2 and the second subpixel PX3b of the third pixel PX3. In addition, the third white pixel PX_w3 may be interposed between the second subpixel PX3b of the third pixel PX3 and the second subpixel PX1b of the first pixel PX1 in a pixel group PXG adjacent to a current pixel group PXG (not shown) in a horizontal direction.

Each of the first through third pixels PX1 through PX3 may include a first TFT coupled to the first subpixel PX1a, PX2a, or PX3a and a second TFT coupled to the second subpixel PX1b, PX2b, or PX3b. The structures of the first pixel PX1 and the first white pixel PX_w1 in a pixel group PXG will now be described in more detail with reference to FIG. 10.

Referring to FIG. 10, the first pixel PX1 includes the first subpixel PX1a and the second subpixel PX1b. In addition, the first pixel PX1 includes a first TFT T11a coupled to the first subpixel PX1a and a second TFT T11b coupled to the second subpixel PX1b. In the present exemplary embodiment, the first white pixel PX_w1 may share the second TFT T11b, which is coupled to the second subpixel PX1b of the first pixel PX1, with the second subpixel PX1b. That is, a second drain electrode 666b of the second TFT T11b of the first pixel PX1 is connected to a drain electrode 667 of the first white pixel PX_w1 by an extension 668 of the drain electrode 667. Thus, the second subpixel PX1b and the first white pixel PX_w1 may share a source electrode 665b of the second TFT T11b. A second subpixel electrode 612b of the first pixel PX1 may be electrically connected to the second drain electrode 666b by a second contact 606b, and a pixel electrode 613 of the first white pixel PX_w1 may be electrically connected to the drain electrode 667 by a white pixel contact 607.

In the current exemplary embodiment of an LCD, white pixels are alternately interposed between second subpixels of first through third pixels. A data voltage applied to each second subpixel is higher than a data voltage applied to each first subpixel. Therefore, although the white pixels are smaller than the first through third pixels, high luminance can be achieved. In addition, since the white pixels share second TFTs of the first through third pixels with the first through third pixels, only a contact portion of the driving circuitry is formed in each white pixel region. Consequently, a reduction in the transmittance of a white pixel can be minimized, thereby improving the visibility and display quality of the LCD.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display comprising:
a gate line which is disposed on a first substrate and extends in a first direction;
a plurality of pairs of a first data line and a second data line, each pair of a first data line and a second data line being insulated from the gate line, the first data line and the second data line of each pair of a first data line and a second data line extending in a second direction substantially perpendicular to the first direction, the plurality of pairs of a first data line and a second data line bordering a plurality of pixel regions, wherein the first data line and the second data line of each pair of a first data line and a second data line are disposed respectively on both sides of an individual pixel region of the plurality of pixel regions and are separated from each other;
a plurality of pairs of a first thin-film transistor and a second thin-film transistor which are connected to the gate line and a pair of a first data line and a second data line of the plurality of pairs of a first data line and a second data line, respectively; and
a first subpixel electrode and a second subpixel electrode disposed in each pixel region of the plurality of pixel regions and connected to the first thin-film transistor and the second thin-film transistor, respectively,
wherein the plurality of pixel regions comprise first through third pixel regions arranged sequentially in the first direction, wherein at least one of the first thin-film transistor and the second thin-film transistor of the second pixel region is disposed outside the second pixel region and on a same side of an adjacent data line of the pair of a first data line and a second data line as the first subpixel electrode and the second subpixel electrode of one of the first and third pixel regions.

2. The liquid crystal display of claim 1, wherein the first thin-film transistor of the second pixel region is disposed on a same side of the first data line of the pair of a first data line and a second data line including the second pixel region as the first and second subpixel electrodes of the first pixel region, and the second thin-film transistor of the second pixel region is disposed on a same side of the second data line of the pair of a first data line and a second data line including the second pixel region as the first and second subpixel electrodes of the third pixel region.

3. The liquid crystal display of claim 1, wherein first through third color filters are formed in the first through third pixel regions, respectively, wherein the second color filter is larger than the first color filter and the third color filter.

4. The liquid crystal display of claim 1, further comprising a plurality of color filters disposed in the plurality of pixel regions, wherein any one of a green filter and a red filter is disposed in the first pixel region, the other one of the green filter and the red filter is disposed in the third pixel region, and a blue filter is disposed in the second pixel region.

5. The liquid crystal display of claim 4, wherein the color filters are disposed on the first substrate.

6. The liquid crystal display of claim 1, wherein each pixel region of the plurality of pixel regions comprises a first contact which electrically connects the first thin-film transistor to the first subpixel electrode, and a second contact which electrically connects the second thin-film transistor to the second subpixel electrode, wherein at least one of the first contact and the second contact of the second pixel region is disposed on a same side of the pair of a first data line and a second data line including the second pixel region as the first subpixel electrode and the second subpixel electrode of one of the first pixel region and the third pixel regions.

7. The liquid crystal display of claim 1, wherein the first thin-film transistor of the second pixel region is interposed between the second data line of the first pixel region, which is located closer to the second pixel region than the first data line of the first pixel region, and the first data line of the second pixel region which is located closer to the first pixel region than the second data line of the second pixel region.

8. The liquid crystal display of claim 7, wherein the second data line of the first pixel region is separated from the first data line of the second pixel region by a first distance in a first area, and the second data line of the first pixel region is separated from the first data line of the second pixel region by a second distance, which is greater than the first distance, in a second area, and wherein the first thin-film transistor of the second pixel region is disposed in the second area.

9. The liquid crystal display of claim 7, wherein the first subpixel electrode of the second pixel region is insulated from the first data line of the second pixel region, overlaps the first data line of the second pixel region as seen from a top plan view, and is electrically connected to the first thin-film transistor of the second pixel region.

10. The liquid crystal display of claim 1, further comprising a second substrate disposed substantially opposite to the first substrate, wherein a patternless common electrode is disposed on the second substrate.

11. A liquid crystal display comprising:
a gate line which is disposed on a substrate and extends in a first direction;
a plurality of pairs of a first data line and a second data line which are insulated from the gate line, and which are extend in a second direction to be disposed substantially perpendicular to the gate line, wherein the plurality of pairs of a first data line and a second data line respectively border a plurality of pixel regions, and wherein a first data line and a second data line of a pair of a first data line and a second data line are disposed on opposite sides of an individual pixel region of the plurality of pixel regions and are separated from each other;
a plurality of pairs of a first thin-film transistor and a second thin-film transistor which are connected to the gate line and a pair of a first data line and a second data line of the plurality of pairs of a first data line and a second data line, respectively; and
a first subpixel electrode and a second subpixel electrode which are disposed in each of the plurality of pixel regions and are connected to a first thin-film transistor and a second thin-film transistor of a pair of the plurality of pairs of a first thin-film transistor and a second thin-film transistor, respectively,
wherein the plurality of pixel regions comprise a first pixel region and a second pixel region arranged sequentially in the first direction, wherein the first data line of the second pixel region and the second data line of the first pixel region substantially surround the first thin-film transistor of the second pixel region.

12. The liquid crystal display of claim 11, wherein the first data line of the second pixel region extends substantially straightly and the second data line of the first pixel region includes a first portion which extends in the first direction, a second portion which extends in the second direction and connects to the first portion, and a third portion which extends in the first direction and connects to the second portion to surround the first thin-film transistor of the second pixel region.

13. The liquid crystal display of claim 11, wherein a blue filter is disposed in the second pixel region, and one of a green filter and a red filter is disposed in the first pixel region.

14. The liquid crystal display of claim 13, wherein the red filter, the green filter, and the blue filter are disposed on the substrate.

15. A liquid crystal display comprising:
   a gate line which extends in a first direction;
   a plurality of data lines which are insulated from the gate line, overlap at least a portion of the plurality of gate lines, and extend in a second direction that is different from the first direction; and
   a plurality of pixels, each of which displays an image based on a gate signal and a data signal received respectively from the gate line and the plurality of data lines and wherein the plurality of pixels is divided into a plurality of pixel groups,
   wherein each pixel group comprises first through third pixels arranged sequentially in the first direction and a plurality of white pixels, and each of the first through third pixels comprises a first subpixel and a second subpixel, wherein a voltage level of a first data signal transmitted to the first subpixel is lower than a voltage level of a second data signal transmitted to the second subpixel, and the white pixels are alternately interposed between the respective second subpixels of the first through third pixels.

16. The liquid crystal display of claim 15, wherein the first pixel is a red pixel, the second pixel is a green pixel, and the third pixel is a blue pixel.

17. The liquid crystal display of claim 15, wherein the second subpixel is narrower than the first subpixel.

18. The liquid crystal display of claim 15, wherein each of the first through third pixels comprises a first thin-film transistor coupled to the first subpixel and a second thin-film transistor coupled to the second subpixel, and each of the white pixels is electrically connected to the second thin-film transistor coupled to the second subpixel of the respective first through third pixels.

19. The liquid crystal display of claim 18, wherein the plurality of pixel groups comprise a first pixel group and a second pixel group, and the white pixels comprise a first white pixel interposed between the second subpixel of the first pixel in the first pixel group and the second subpixel of the second pixel in the first pixel group, a second white pixel interposed between the second subpixel of the second pixel in the first pixel group and the second subpixel of the third pixel in the first pixel group, and a third white pixel interposed between the second subpixel of the third pixel in the first pixel group and the second subpixel of the first pixel in the second pixel group, wherein the first white pixel is coupled to the second thin-film transistor of the first pixel of the first pixel group, the second white pixel is coupled to the second thin-film transistor of the second pixel of the first pixel group, and the third white pixel is coupled to the second thin-film transistor of the third pixel of the first pixel group.

* * * * *